United States Patent Office 2,956,930
Patented Oct. 18, 1960

2,956,930

ANTIBIOTIC PRODUCTION

Lee C. Cheney and Joseph Lein, Fayetteville, N.Y., assignors, by mesne assignments, to Bristol-Myers Company, New York, N.Y., a corporation of Delaware No Drawing. Filed Aug. 30, 1956, Ser. No. 606,964

11 Claims. (Cl. 195—80)

This invention relates to the production of tetracycline by fermentation and, more particularly, to the production of tetracycline by submerged, aerobic fermentation of a chlortetracycline-producing species of Streptomyces, e.g. S. aureofaciens, in the presence of 2-mercapto-4,5-dimethylthiazole as an inhibitor of the usual simultaneous formation of chlortetracycline.

The fermentation of S. aureofaciens normally produces no more than 20–50%, and often as little as 7%, tetracycline with the remaining antibiotic activity being found to be chlortetracycline (see J. Amer. Chem. Soc. 78, 1508, April 1956, and Antibiotics Annual 1953–4, pages 49–55). In order to be practical for commercial use, the desired tetracycline must constitute at least 80% of the antibiotic activity in the fermentation broth, and preferably at least 95% of such activity. The reason for this requirement is found in the extreme difficulty of separating tetracycline from chlortetracycline on a commercial scale. Thus, a product comprising 80% tetracycline and 20% chlortetracycline is suitable only for such uses as food preservation, and animal and plant therapy or growth stimulation. A product comprising 95% tetracycline and 5% chlortetracycline can be used in human therapy or easily refined until suitable for such use, e.g. by alkaline degradation of the chlortetracycline present without substantial loss of tetracycline.

Various procedures have been used to obtain mixtures of tetracycline and chlortetracycline containing at least 80%, and preferably 95%, tetracycline. Thus, the fermentation of the chlortetracycline-producing species of Streptomyces has been carried out in a medium from which the chloride ions have been removed (Minieri et al., U.S. Patent 2,734,018) or in which ions such as bromide inhibit the chloride ions (Lein et al., U.S. Patent 2,739,924) or in which certain particular constituents are used in the medium as the source of nitrogen (Hatch et al., U.S. Patent application Serial No. 473,756, now matured into U.S. Patent No. 2,763,591).

All of these procedures suffer from such drawbacks as expense of the materials or processes used, reduction of potency of the broth as by toxic effects on the microorganisms, and geographical or seasonal unavailability of necessary constituents of the medium.

It is the object of the present invention to provide a simple, inexpensive and completely practical process for fermenting a chlortetracycline-producing species of Streptomyces, e.g. S. aureofaciens, which will produce a highly potent antibiotic broth in which at least 80%, and preferably at least 95%, of the antibiotic activity is due to tetracycline. It is a further and essential object of the present invention to provide such a process which is suitable for use with such widely available, highly effective, frequently used constituents of fermentation media as corn steep liquor, beet sugar molasses and tap water.

Each of these constituents contribute large amounts of chloride ion to the medium and thus normally lead to the formation of a preponderance of chlortetracycline. Thus, even tap water will often contribute 5 to 15 p.p.m. (parts per million) chloride, 4% corn steep in the medium will contribute about 120 p.p.m. chloride and molasses will contribute as much or more than corn steep liquor. But only 71 p.p.m. chloride ion in a medium can lead to the production of 1000 mcg./ml. chlortetracycline, which constitutes 33% of the activity of even a broth having a potency as high as 3000 mcg./ml. Conversely, at minimum chloride levels where the efficiency of utilization of chloride by S. aureofaciens is greatest, as little as 11 p.p.m. chloride can lead to 150 mcg./ml. or 5% of the activity of a 3000 mcg./ml. broth. Thus it is required that the process of the present invention be suitable for use with fermentation media containing a substantial amount of chloride ion, that is, 20 p.p.m. or more. For practical purposes, it is also necessary that the fermentation broths contain at least 2000 mcg./ml. tetracycline.

The objects of the present invention have been achieved and there is now provided, according to the present invention, a process for the production of tetracycline which comprises growing under submerged aerobic conditions a culture of chlortetracycline-producing species of Streptomyces, e.g. S. aureofaciens, in an anqueous, nitrogenous nutrient containing, carbohydrate solution containing a substantial amount of chloride ion in the presence of from 0.001 to 0.010 percent by weight of the medium of 2-mercapto-4,5-dimethylthiazole until substantial antibacterial activity comprising at least 2000 mcg./ml. tetracycline is imparted to said solution, said activity being caused by the presence of tetracycline and chlortetracycline in a weight ratio of at least 80 parts tetracycline per 20 parts chlortetracycline.

As a further and more specific embodiment of the present invention there is provided a process for the production of tetracycline which comprises growing under submerged aerobic conditions a culture of a chlortetracycline-producing species of Streptomyces, e.g., S. aureofaciens, in an aqueous, nitrogenous nutrient containing carbohydrate solution containing a substantial amount of chloride ion in the presence of from 0.001 to 0.010 percent by weight of the medium of 2-mercapto-4,5-dimethylthiazole and from 0.003 to 2.0 percent by weight of the medium of bromide ions until substantial antibacterial activity comprising at least 2000 mcg./ml. tetracycline is imparted to said solution, said activity being caused by the presence of tetracycline and chlortetracycline in a weight ratio of at least 95 parts tetracycline per 5 parts chlortetracycline.

This invention embraces a process for growing chlortetracycline-producing species of Streptomyces at about 24°–30° C. under submerged, aerated conditions on media consisting of a source of carbon, a source of nitrogen, a source of growth substances, mineral salts such as potassium phosphate, magnesium sulfate and sodium nitrate and, when desired, a buffering agent such as calcium carbonate with the addition to the medium of 2-mercapto-4,5-dimethylthiazole as an inhibitor of the usual simultaneous formation of chlortetracycline. The amounts of 2-mercapto-4,5-dimethylthiazole required are astonishingly small and range from 0.001 to 0.010 percent by weight of the medium. Amounts greater than 0.010 percent are toxic to the Streptomyces, as shown by a rapid drop in the potency of the fermentation broth, i.e., the amount of antibacterial activity present. Thus, as shown in the working example below, the addition of only 0.005 percent of 2-mercapto-4,5-dimethylthiazole to the media increases the relative amount of tetracycline from less than 50% to at least 80% of the combined weight of tetracycline and chlortetracycline formed. This effect is apparent in a medium containing a substantial amount of chloride ion (in this case at least 240 p.p.m. derived from the addition of 0.04% NaCl) which is sufficient to produce over 3300 mcg./ml. chlortetracycline. The effect of the 2- mercapto-4,5-dimethylthiazole in increasing the percentage of tetracycline to at least 80% was all the more surprising in view of the failure of 2-mercaptothiazoline and 2-mercapto-4,6,6-trimethylthiazine to do the same.

It is theorized, but not certain, that the inhibition of the formation of chlortetracycline demonstrated by the process of this invention may be produced by interference with enzymatic processes and perhaps by the process commonly referred to as "competitive inhibition." However, this invention is not dependent upon nor restricted to any such theory.

With regard to other details, the process is carried out in the manner, and using the media etc., of the usual production of chlortetracycline by S. aureofaciens; for example, according to U.S. Patents 2,482,055, 2,609,329, 2,709,672 and Canadian Patents 499,649 and 524,449. The process of the present invention is of particular value in that it permits the use of ingredients of the medium which are in plentiful supply at all times, are very inexpensive and have long been known to be very effective for this purpose, e.g. corn steep liquor and molasses, both of which contain substantial amounts of chloride ion.

When it is considered desirable to keep the formation of chlortetracycline to an absolute minimum, it has been found that this can be done by adding both 2-mercapto-4,5-dimethylthiazole and from 0.003 to 2.0 percent of a water-soluble, non-toxic bromide to the fermentation medium. The surprisingly low amounts of about 0.0075 percent of both 2-mercapto-4,5-dimethylthiazole and sodium bromide are the preferred quantities for the production of at least 95% tetracycline in the presence of substantial amounts of chloride ion. The percentage of tetracycline is raised to 99% or higher by increasing the amount of bromide to 0.05 to 0.5 percent while using 0.005 percent 2-mercapto-4,5-dimethylthiazole. The bromide ion is conveniently added as sodium bromide, potassium bromide, calcium bromide, ammonium bromide or hydrobromic acid but any non-toxic, water-soluble compound which ionizes in water to give bromide ions may be used.

Further information is supplied by the following example which is provided for purposes of information only and is not to be construed as limiting the invention.

*Example*

Sterile medium of high chloride ion content was prepared containing 7% sucrose, 0.45% $(NH_4)_2SO_4$, 0.6% $CaCO_3$, 2% Pharmamedia (cottonseed endosperm flour), 1.5% dechlorinated corn steep liquor (dechlorinated with silver nitrate as in Hatch et al., application Serial No. 473,756, and containing by analysis about 44 p.p.m. chloride ion), 0.04% NaCl, 0.003% $ZnSO_4 \cdot 7H_2O$. The extra ingredients tabulated below were added to separate samples of this medium and the resultant media were inoculated with 5% inoculum of the vegetative growth of a strain of S. aureofaciens and fermented for seven days at 80° F. on a rotary shaker at 235 r.p.m. using 28 ml. medium per 125 ml. Erlenmeyer flask. The broths were then acidified to about pH 2 and centrifuged and the supernatant liquid was analyzed for the total amount of tetracyclines present by ultra-violet absorption analysis at 355 m$\mu$ and for the relative proportion of tetracycline and chlortetracycline by quantitative paper strip chromatography to give the results tabulated below.

| Added Ingredient | Total Tetracyclines, mcg./ml. | Percentage Tetracycline |
| --- | --- | --- |
| None | 2,550 | <50 |
| 2-Mercaptothiazoline, 0.005% | 2,935 | 50-55 |
| 2-Mercapto-4,6,6-trimethylthiazine, 0.005% | 2,145 | <50 |
| 2-Mercapto-4,5-dimethylthiazole, 0.005% | 2,030 | 80-85 |
| 2-Mercapto-4,5-dimethylthiazole, 0.005% and 0.5% NaBr | 1,055 | 99.5 |

We claim:

1. A process for the production of tetracycline which comprises growing under submerged aerobic conditions a culture of *Streptomyces aureofaciens* in an aqueous, nitrogenous nutrient containing, carbohydrate solution containing a substantial amount of chloride ion in the presence of from 0.001 to 0.010 percent by weight of the medium of 2-mercapto-4,5-dimethylthiazole until substantial antibacterial activity comprising at least 2000 mcg./ml. tetracycline is imparted to said solution, said activity being caused by the presence of tetracycline and chlortetracycline in a weight ratio of at least 80 parts tetracycline per 20 parts chlortetracycline.

2. A process for the production of tetracycline which comprises growing under submerged aerobic conditions a culture of *Streptomyces aureofaciens* in an aqueous, nitrogenous nutrient containing, carbohydrate solution containing a substantial amount of chloride ion in the presence of about 0.005 percent by weight of the medium of 2-mercapto-4,5-dimethylthiazole until substantial antibacterial activity comprising at least 2000 mcg./ml. tetracycline is imparted to said solution, said activity being caused by the presence of tetracycline and chlortetracycline in a weight ratio of at least 80 parts tetracycline per 20 parts chlortetracycline.

3. A process for the production of tetracycline which comprises growing under submerged aerobic conditions a culture of *Streptomyces aureofaciens* in an aqueous, nitrogenous nutrient containing carbohydrate solution containing a substantial amount of chloride ion in the presence of from 0.001 to 0.010 percent by weight of the medium of 2-mercapto-4,5-dimethylthiazole and from 0.003 to 2.0 percent by weight of the medium of bromide ions until substantial antibacterial activity comprising at least 2000 mcg./ml. tetracycline is imparted to said solution, said activity being caused by the presence of tetracycline and chlortetracycline in a weight ratio of at least 95 parts tetracycline per 5 parts chlortetracycline.

4. A process for the production of tetracycline which comprises growing under submerged aerobic conditions a culture of *Streptomyces aureofaciens* in an aqueous, nitrogenous nutrient containing carbohydrate solution containing a substantial amount of chloride ion in the presence of about 0.0075 percent by weight of the medium of 2-mercapto-4,5-dimethylthiazole and about 0.0075 percent by weight of the medium of bromide ions until substantial antibacterial activity comprising at least 2000 mcg./ml. tetracycline is imparted to said solution, said activity being caused by the presence of tetracycline and chlortetracycline in a weight ratio of at least 95 parts tetracycline per 5 parts chlortetracycline.

5. A process for the production of tetracycline which comprises growing under submerged aerobic conditions a culture of *Streptomyces aureofaciens* in an aqueous, nitrogenous nutrient containing carbohydrate solution containing a substantial amount of chloride ion in the presence of from 0.001 to 0.010 percent by weight of the medium of 2-mercapto-4,5-dimethylthiazole and from 0.003 to 2.0 percent by weight of the medium of an alkali metal bromide until substantial antibacterial activity comprising at least 2000 mcg./ml. tetracycline is imparted to said solution, said activity being caused by the presence of tetracycline and chlortetracycline in a weight ratio of at least 95 parts tretracycline per 5 parts chlortetracycline.

6. A process for the production of tetracycline which comprises growing under submerged aerobic conditions a culture of *Streptomyces aureofaciens* in an aqueous, nitrogenous nutrient containing carbohydrate solution containing a substantial amount of chloride ion in the presence of from 0.001 to 0.010 percent by weight of the medium of 2-mercapto-4,5-dimethylthiazole and from 0.003 to 2.0 percent by weight of the medium of an alkaline earth metal bromide until substantial antibacterial activity comprising at least 2000 mcg./ml. tetracycline is imparted to said solution, said activity being caused by the presence of tetracycline and chlortetracycline in a weight ratio of at least 95 parts tetracycline per 5 parts chlortetracycline.

7. A process for the production of tetracycline which comprises growing under submerged aerobic conditions a culture of *Streptomyces aureofaciens* in an aqueous, nitrogenous nutrient containing carbohydrate solution containing a substantial amount of chloride ion in the presence of from 0.001 to 0.010 percent by weight of the medium of 2-mercapto-4,5-dimethylthiazole and from 0.003 to 2.0 percent by weight of the medium of sodium bromide until substantial antibacterial activity comprising at least 2000 mcg./ml. tetracycline is imparted to said solution, said activity being caused by the presence of tetracycline and chlortetracycline in a weight ratio of at least 95 parts tetracycline per 5 parts chlortetracycline.

8. A process for the production of tetracycline which comprises growing under submerged aerobic conditions a culture of *Streptomyces aureofaciens* in an aqueous, nitrogenous nutrient containing carbohydrate solution containing a substantial amount of chloride ion in the presence of from 0.001 to 0.010 percent by weight of the medium of 2-mercapto-4,5-dimethylthiazole and from 0.003 to 2.0 percent by weight of the medium of potassium bromide until substantial antibacterial activity comprising at least 2000 mcg./ml. tetracycline is imparted to said solution, said activity being caused by the presence of tetracycline and chlortetracycline in a weight ratio of at least 95 parts tetracycline per 5 parts chlortetracycline.

9. A process for the production of tetracycline which comprises growing under submerged aerobic conditions a culture of *Streptomyces aureofaciens* in an aqueous, nitrogenous nutrient containing carbohydrate solution containing a substantial amount of chloride ion in the presence of from 0.001 to 0.010 percent by weight of the medium of 2-mercapto-4,5-dimethylthiazole and from 0.003 to 2.0 percent by weight of the medium of hydrogen bromide until substantial antibacterial activity comprising at least 2000 mcg./ml. tetracycline is imparted to said solution, said activity being caused by the presence of tetracycline and chlortetracycline in a weight ratio of at least 95 parts tetracycline per 5 parts chlortetracycline.

10. A process for the production of tetracycline which comprises growing under submerged aerobic conditions a culture of *Streptomyces aureofaciens* in an aqueous, nitrogenous nutrient containing carbohydrate solution containing a substantial amount of chloride ion in the presence of from 0.001 to 0.010 percent by weight of the medium of 2-mercapto-4,5-dimethylthiazole and from 0.003 to 2.0 percent by weight of the medium of calcium bromide until substantial antibacterial activity comprising at least 2000 mcg./ml. tetracycline is imparted to said solution, said activity being caused by the presence of tetracycline and chlortetracycline in a weight ratio of at least 95 parts tetracycline per 5 parts chlortetracycline.

11. A process for the production of tetracycline which comprises growing under submerged aerobic conditions a culture of *Streptomyces aureofaciens* in an aqueous, nitrogenous nutrient containing carbohydrate solution containing a substantial amount of chloride ion in the presence of from 0.001 to 0.010 percent by weight of the medium of 2-mercapto-4,5-dimethylthiazole and from 0.003 to 2.0 percent by weight of the medium of ammonium bromide until substantial antibacterial activity comprising at least 2000 mcg./ml. tetracycline is imparted to said solution, said activity being caused by the presence of tetracycline and chlortetracycline in a weight ratio of at least 95 parts tetracycline per 5 parts chlortetracycline.

References Cited in the file of this patent

UNITED STATES PATENTS

| | | |
|---|---|---|
| 2,712,517 | Gourevitch et al. | July 5, 1955 |
| 2,734,018 | Minieri et al. | Feb. 7, 1956 |
| 2,739,924 | Lein et al. | Mar. 27, 1956 |
| 2,763,591 | Hatch et al. | Sept. 18, 1956 |

FOREIGN PATENTS

| | | |
|---|---|---|
| 781,843 | Great Britain | Aug. 28, 1957 |
| 782,125 | Great Britain | Sept. 14, 1957 |
| 316,291 | Switzerland | Nov. 15, 1956 |

OTHER REFERENCES

Martell et al.: Chemistry of the Metal Chelate Compounds, Prentice-Hall Inc., N.J., 1952, pages 135–143, 471, 503.

Sekizawa: Jour. of Biochemistry, vol. 40, No. 20, March 1955, pages 217–219.